United States Patent
Yamanishi et al.

(10) Patent No.: US 9,026,532 B2
(45) Date of Patent: May 5, 2015

(54) IMAGE FORMING APPARATUS AND FILE MANAGEMENT SYSTEM

(75) Inventors: Fumitake Yamanishi, Kanagawa (JP); Hiroshi Kato, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 164 days.

(21) Appl. No.: 13/525,457

(22) Filed: Jun. 18, 2012

(65) Prior Publication Data

US 2013/0006983 A1    Jan. 3, 2013

(30) Foreign Application Priority Data

Jun. 29, 2011   (JP) ................................. 2011-144712

(51) Int. Cl.
*G06F 7/00*      (2006.01)
*G06F 17/30*     (2006.01)
*H04N 1/21*      (2006.01)

(52) U.S. Cl.
CPC ....................................... *H04N 1/21* (2013.01)

(58) Field of Classification Search
CPC .................... G06F 17/30067; G06F 17/30017
See application file for complete search history.

(56) References Cited

U.S. PATENT DOCUMENTS

| 7,506,250 B2 | 3/2009 | Hull et al. | |
| 2008/0192293 A1* | 8/2008 | Sugimoto | .................... 358/1.15 |
| 2009/0147316 A1 | 6/2009 | Kaneda | |
| 2011/0125806 A1* | 5/2011 | Park | .............................. 707/803 |
| 2011/0264920 A1* | 10/2011 | Rieffel et al. | ................. 713/189 |

FOREIGN PATENT DOCUMENTS

| JP | 2004-127277 | 4/2004 |
| JP | 2006-339928 | 12/2006 |
| JP | 4519899 | 8/2010 |

* cited by examiner

*Primary Examiner* — Loan T Nguyen

(74) *Attorney, Agent, or Firm* — IPUSA, PLLC

(57) ABSTRACT

An image forming apparatus is connected to an information processing apparatus via a network. The information processing apparatus may be configured to accumulate files. The information processing apparatus may include a communicating part configured to communicate with the information processing apparatus; a data obtaining part configured to obtain data to be accumulated; an encrypting part configured to encrypt the data to be accumulated; a metadata generating part configured to transmit the encrypted data to be accumulated to the information processing apparatus, and set metadata, which is received or generated by an operation receiving part, in a property of the data to be accumulated according to a WebDAV protocol; and an access control information setting part configured to set access control information which defines whether to permit an edit, an addition or a deletion of the metadata as well as an access entity according to the WebDAV protocol.

7 Claims, 15 Drawing Sheets

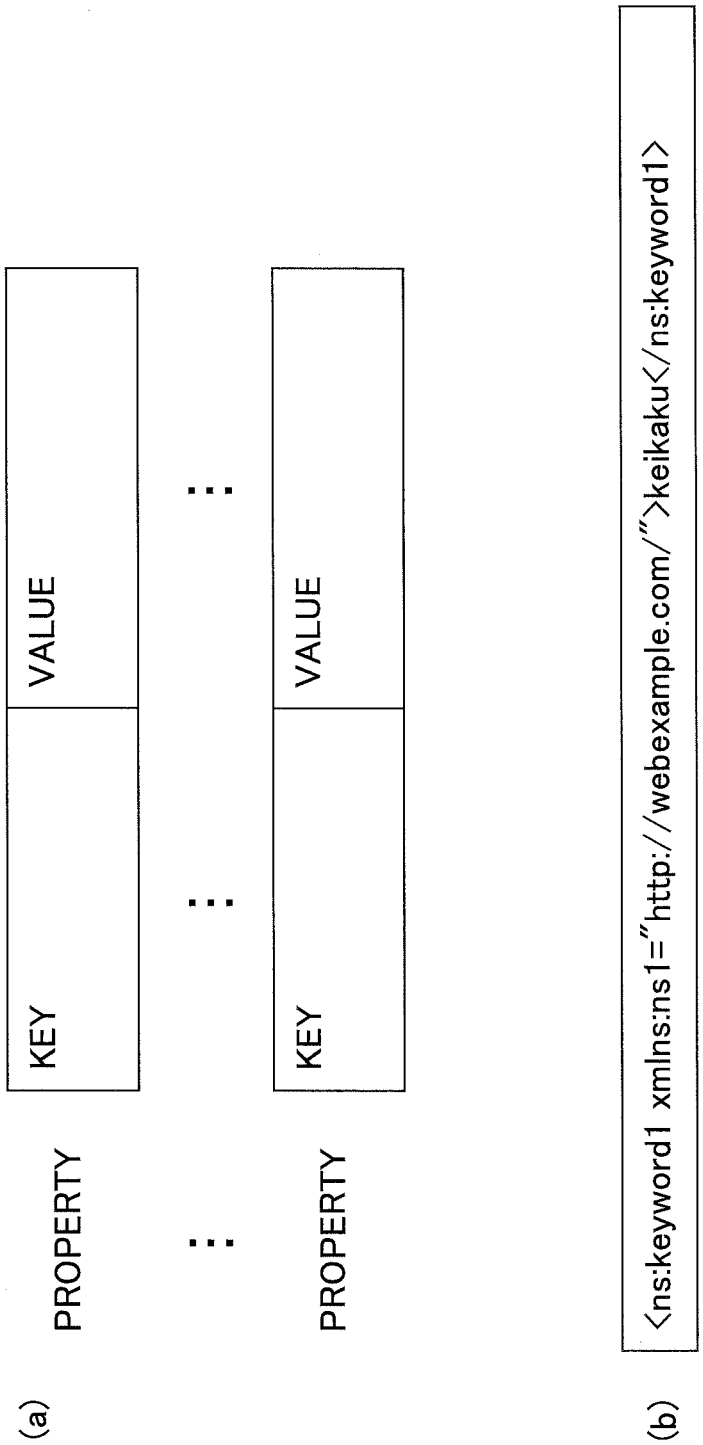

FIG.7

(a)
```
PROPPATCH /webdav/file1.jpg HTTP/1.1  ⎫
Host: http//:web.example.co.jp         ⎪
Content-Type: jpeg/pdf                 ⎬ 1
Content-Length: 200                    ⎪
                                       ⎭

<?xml version="1.0">
<d:propertyupdate xmlns:d="DAV:">      ⎫
  <d:set>                              ⎪
    <d:prop>                           ⎪
      <o:Keyword1>keikaku</o:Keyword1> ⎬ 2
    </d:prop>                          ⎪
  </d:set>                             ⎪
</d:propertyupdate>                    ⎭
```

(b)
```
PROPFIND /WebDav/file1 HTTP/1.1  ⎫
Host: http//:web.example.co.jp   ⎪
Depth: 0                         ⎬ 1
Content-Type: jpeg/pdf           ⎪
Content-Length: 200              ⎭

<?xml version="1.0"?>            ⎫
<d:propfind xmlns:d="DAV:">      ⎪
    <d:prop>                     ⎪
       <d:displayname/>          ⎬ 2
       <o:Keyword1/>             ⎪
    </d:prop>                    ⎪
</d:propfind>                    ⎭
```

FIG.8

```
<?xml version="1.0" encoding="UTF-8"?>
<searchrequest xmlns:D="DAV:">
<D:basicsearch>
<D:select>
 <D:prop>
   <D:keyword1/>
   <D:keyword2/>
      ⋮
 </D:prop>
</D:select>                          } 1
<D:from>
 <D:scope>
   <D:href> /webdav/</D:href>
   <D:depth>infinity</D:depth>
 </D:scope>
</D:from>                            } 2
<D:where>
 <D:eq>
   <D:prop>
     <D:keyword1/>
   </D:prop>
   <D:literal>gazou</D:literal>
 </D:eq>
</D:where>                           } 3
</D:basicsearch>
</searchrequest>
```

FIG.9

```
<D:acl>
  <D:ace>
    <D:principal><D:href>http://www.webexample.com/acl/users1</D:href></D:principal>
    <D:grant>
      <D:privilege><D:read/></Dprivilege>
    </D:grant>
  </D:ace>                                                                              } 1
  <D:ace>
    <D:principal><D:href>http://www.webexample.com/acl/users2</D:href></D:principal>
    <D:grant>
      <D:privilege><D:write/></Dprivilege>
    </D:grant>
  </D:ace>                                                                              } 2
</D:acl>
```

FIG.11

| PLEASE INPUT KEYWORDS | |
|---|---|
| KEYWORD 1 | KEYWORD 4 |
| KEYWORD 2 | KEYWORD 5 |
| KEYWORD 3 | KEYWORD 6 |
| | OK |

PLEASE INPUT SEARCH KEY TO SEARCH FOR KEYWORDS

| SEARCH KEY 1 | ... | SEARCH KEY n |

SEARCH KEY TO BE SEARCHED FOR

- ● KEYWORD 1
- ○ KEYWORD 2
- ○ KEYWORD 3
- ○ KEYWORD 4
- ○ KEYWORD 5
- ○ KEYWORD 6

SEARCH KEY

OK (b)

FILE LIST

SEARCH KEY   PROJECT

|  | KEYWORD 1 | KEYWORD 2 | KEYWORD 3 |
|---|---|---|---|
| 1.jpg | PLAN | 2011/02/01 | PROJECT A |
| 2.jpg | PROJECT B | | |
| 3.jpg | PROJECT C | SCHEDULE | |

NEXT   PRINT

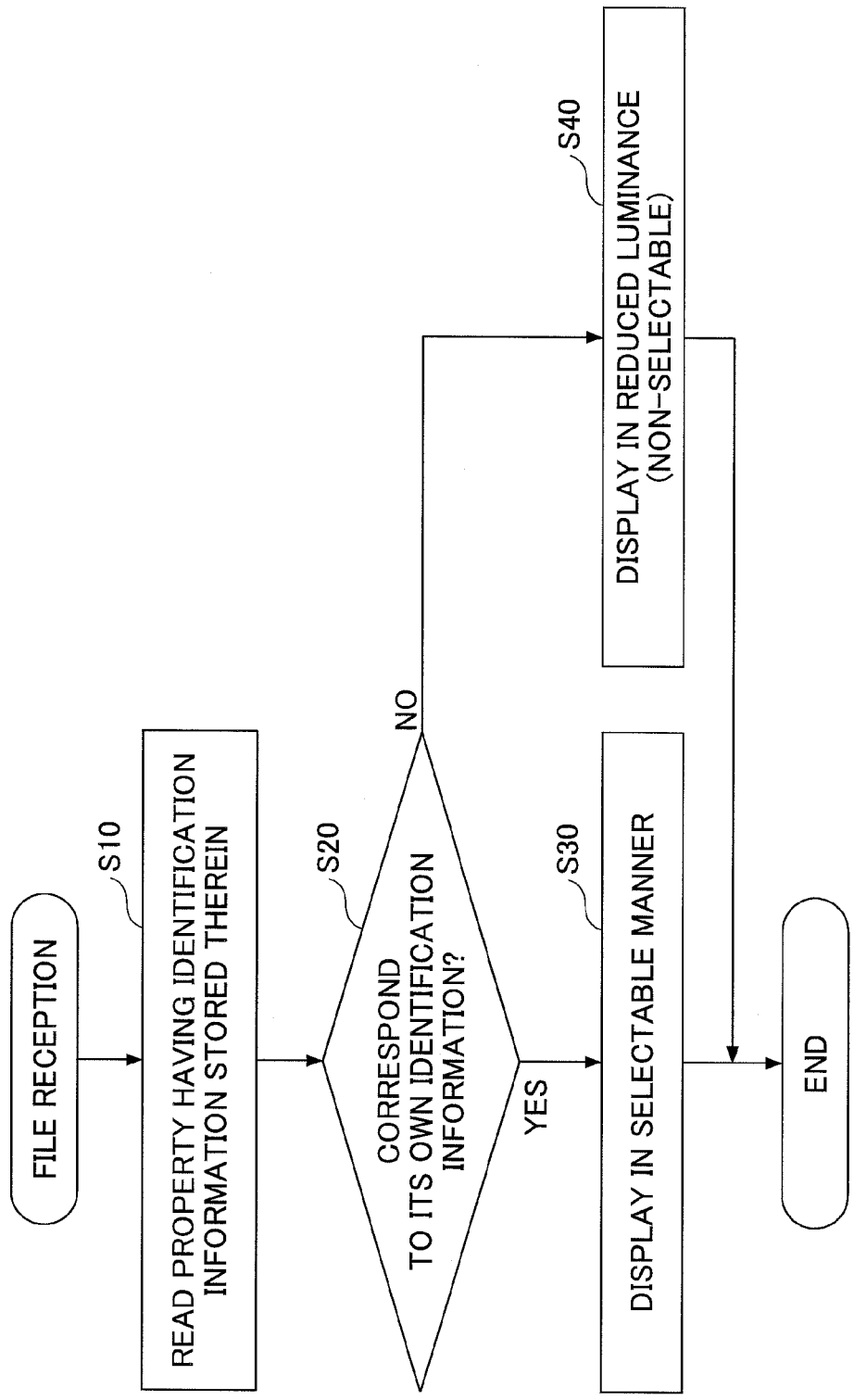

IMAGE FORMING APPARATUS AND FILE MANAGEMENT SYSTEM

FIELD

This disclosure is related to an image forming apparatus connected to an information processing apparatus via a network.

BACKGROUND

A cloud service has come to be known to public because nowadays an Internet is widely used. According to the cloud service, a user can be provided with a service utilizing programs, data or the like via the Internet instead of storing programs or data in a local storage at an office or home to utilize them.

As the cloud service is widely used, there is an increasing interest in security of data on the cloud. In this connection, according to a known technique, the data on the cloud is encrypted in order to preserve the security.

However, if the data on the cloud is encrypted, the user cannot directly check the content of the data or perform a search. According to an example of a way of searching for the encrypted data, metadata is attached to the encrypted data and the metadata is to be searched (see Patent Document 1). Since the metadata is not encrypted, the user can check the content of the data from the metadata and perform the search using the metadata.

Patent Document 1 discloses an image forming apparatus in which scanned image data is associated with an ID input by the user, and when there is a demand to read information stored in a storage part, the user who requests the process is made to input his/her ID, and if the input user ID corresponds to the user ID associated with the image data, an access to the demanded image data is permitted.

However, Patent Document 1 does not consider the utilization of the cloud service and does not disclose how to edit, etc., the metadata of the image data on the Internet. Further, even if the data is encrypted, the access to the metadata should be limited depending on an authority; however, Patent Document 1 does not consider the access limit to the metadata in the cloud service.

[Patent Document 2] Japanese Laid-open Patent Publication No. 2006-339928

SUMMARY

According to an embodiment, an image forming apparatus is provided which is connected to an information processing apparatus via a network. The image forming apparatus may be configured to accumulate files. The information processing apparatus may include a communicating part configured to communicate with the information processing apparatus; a data obtaining part configured to obtain data to be accumulated; an encrypting part configured to encrypt the data to be accumulated; a metadata generating part configured to transmit the encrypted data to be accumulated to the information processing apparatus, and set metadata, which is received or generated by an operation receiving part, in a property of the data to be accumulated according to a WebDAV protocol; and an access control information setting part configured to set access control information which defines whether to permit an edit, an addition or a deletion of the metadata as well as an access entity according to the WebDAV protocol.

BRIEF DESCRIPTION OF DRAWINGS

FIG. 6 is a diagram for schematically illustrating a functional configuration of a property.

FIG. 7 is a diagram for illustrating an example of a description of a method with respect to a WebDAV request to perform an addition and an edit of the property.

FIG. 8 is a diagram for illustrating an example of a description of a method with respect to a WebDAV request to search for a value of the property.

FIG. 9 is a diagram for illustrating an example of an ACL.

FIG. 11 is a diagram for illustrating an example of an input screen for a keyword displayed on an operation part.

FIG. 13 is a diagram for illustrating an example of a search screen for a file displayed on an operation part.

FIG. 15 is a flowchart of an example of a procedure by which the image forming apparatus determines whether to permit printing based on the property.

DESCRIPTION OF EMBODIMENTS

In the following, embodiments will be described with reference to the accompanying drawings.

Figure 1:
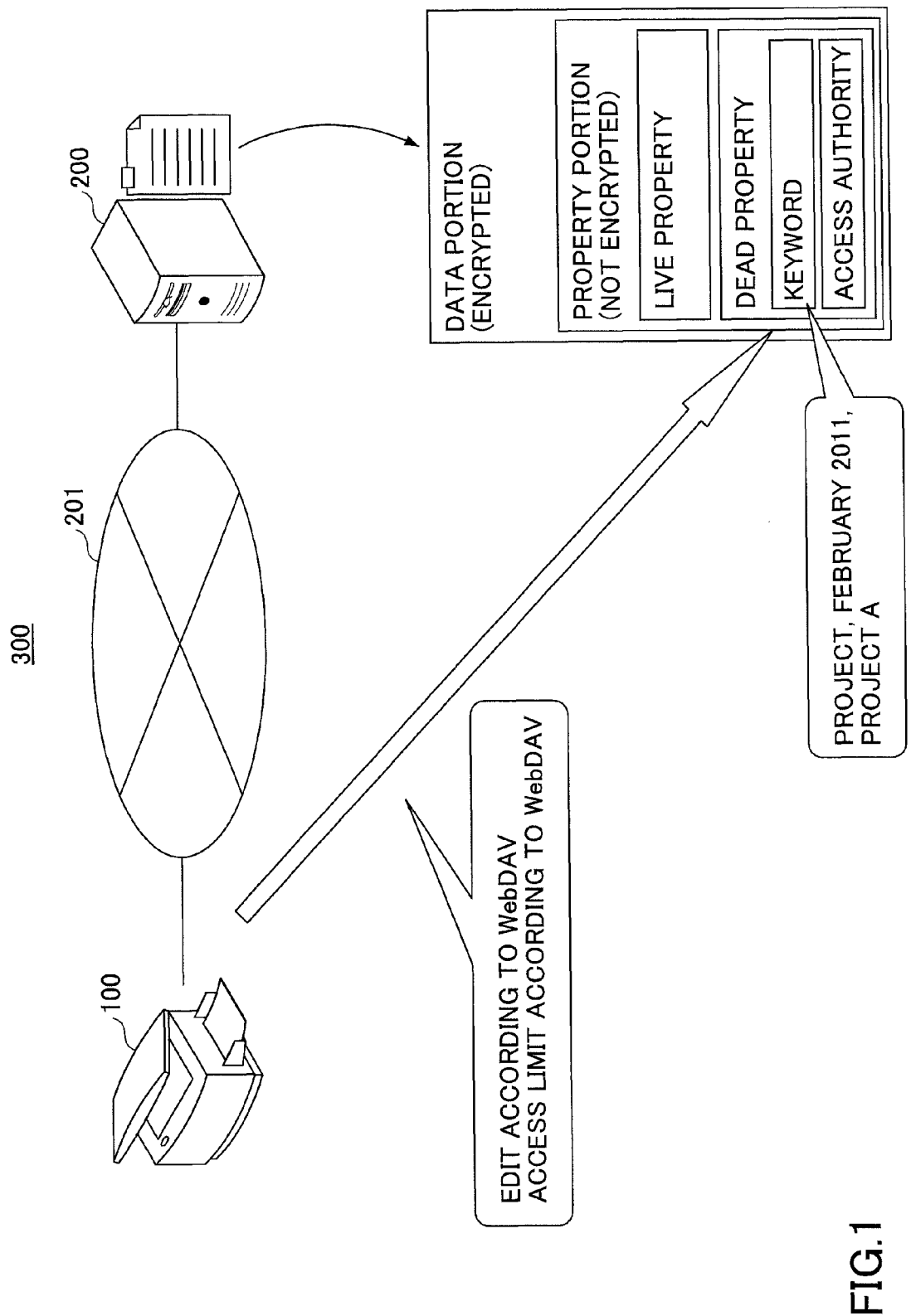
FIG. 1 is a diagram for schematically explaining an example of an overview of a file management system.

FIG. 1 is a diagram for schematically explaining an example of an overview of a file management system 300 according to an embodiment.

An image forming apparatus 100 stores image data, which is obtained by scanning a original document, in a file server 200. The file server 200 is provided on a network 201. The image forming apparatus 100 and the file server 200 corresponds to a so-called cloud service. A user can utilize the image forming apparatus 100 without concern for the location of the file server 200.

The cloud service includes a public cloud in which users are provided with a service mainly via the public Internet and a private cloud in which only particular users are provided with a service via a network such as a corporate intranet. The file management system according to the embodiment can be suited for any cloud services including the public cloud and the private cloud.

The image forming apparatus 100 communicates with the file server 200 according to a WebDAV (Web-based Distributed Authoring and Versioning) protocol. The WebDAV protocol is a communication specification of the extended version of a HTTP protocol. The WebDAV protocol easily enables an edit, an addition or a deletion of the data on the network. Specifically, HTTP enables a client to browse a file only while the WebDAV enables an edit, an addition or a deletion of the file. The edit, etc., of the file is also possible with FTP or SMB; however, the WebDAV is more easily installed than FTP or SMB.

In general, the image data is encrypted in order to preserve security in the cloud service. The encryption is performed by the image forming apparatus 100, for example, and it is necessary to transmit the image data to the image forming apparatus 100 (or the corresponding apparatus) in order to decode it. However, there is a case where the user wants to check only a list of the image data on the image forming apparatus 100 and search for the desired image data from the list before downloading the image data itself and decoding it.

Thus, the file management system 300 according to the embodiment utilizes a property portion which is added to the file of the image data according to the WebDAV protocol. The property portion corresponds to a portion other than a body of the image data and has attribute information of the file described therein. The property portion includes live properties which the server sets and manages according to the WebDAV and dead properties which the client sets and manages. In the live property a file size, a registration date, etc., are registered.

Further, according to the embodiment, a keyword is set in the dead properties of the property portion to promote the search of the image data. This keyword can be edited, added or deleted from the image forming apparatus 100 according to the WebDAV protocol. Thus, the image forming apparatus 100 uses the WebDAV, which is easy to install, to promote the display of the list of the encrypted image data or the selection of the file based on the keyword search.

On the other hand, it is not preferred that the encrypted image data or the property portion can be accessed freely by any users. Thus, according to the embodiment, in the property portion of the WebDAV an access authority for the image data and the property portion is set. According to the WebDAV, the access authority can be set in an ACL (Access Control List) property. The image forming apparatus sets the ACL property to be capable of limiting a read, an edit, an addition or a deletion not only with respect to the image data but with respect to the keyword.

[Configuration Example]

As illustrated in FIG. 1, the image forming apparatus 100 and the file server 200 are connected via the network 201. The image forming apparatus 100 is a printer, a copier, a facsimile, a scanner, etc., or any combination thereof. In the following, it is assumed that the file includes the image data; however, the file may be any file such as a file which includes a document only.

The file server 200 includes a storage which can accumulate massive files and is kind of a computer which can execute programs.

The network 201 is a corporate LAN, a wide-area network (WAN), IP-VNP (Virtual Private Network), an Internet VPN, the Internet or the like. Further, the network 201 may be a combination of these networks. The network 201 may be any type as long as the image forming apparatus 100 and the file server 200 can communicate with each other. The network 201 may partly include a telephone line. The network 201 may includes a wired connection or a wireless connection.

Figure 2:
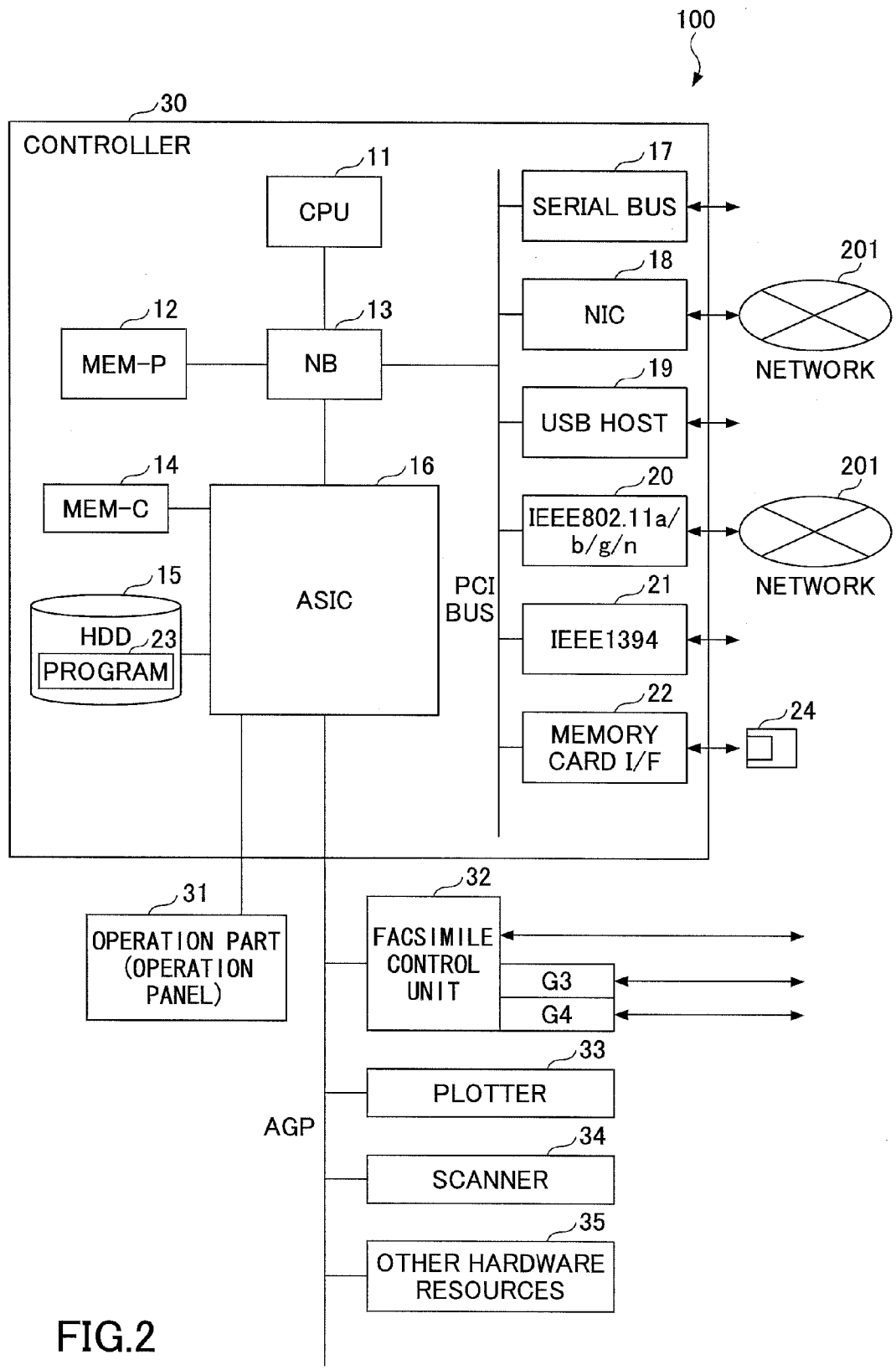
FIG. 2 is a diagram for illustrating an example of a hardware configuration of an image forming apparatus.

FIG. 2 is a diagram for illustrating an example of a hardware configuration of the image forming apparatus 100. The image forming apparatus 100 includes a controller 30, an operation part 31, a facsimile control unit 32, a plotter 33, a scanner 34 and other hardware resources 35. The controller 30 includes a CPU 11, an MEM-P 12, a NB (north bridge) 13, an ASIC 16, a MEM-C 14, a HDD (Hard Disk Drive) 15 and peripherals connected to the NB 13 via a PCI bus.

In the controller 30, to the ASIC 16 are connected the MEM-C 14, the HDD 15 and the NB 13, and to the NB 13 are connected the CPU 11 and the MEM-P 12. The NB 13 is a kind of a CPU chipset and functions as a bridge for connecting the CPU 11, the MEM-P 12, the ASIC 16 and the peripherals.

The ASIC 16 is an integrated circuit specific for image processing and performs various image processes. The ASIC 16 also functions as a bridge for connecting an AGP, the HDD 15 and MEM-C 14. The CPU 11 performs control of the image forming apparatus 100 as a whole, and starts and runs various applications installed in the image forming apparatus 100.

The MEM-P 12 is a system memory used by systems of the image forming apparatus 100. The MEM-P 14 is a local memory used as a buffer of the image data during the image processing.

The HDD 15 is a mass storage. A SSD (Solid State Drive) or the like may be used. In the HDD 15 are stored an OS, various applications, font data, etc. Further, a program 23 for performing a process of the WebDAV protocol is stored in the HDD 15.

The peripherals include a serial bus 17, a NIC (Network Interface Card) 18, a USB host 19, an IEEE 802.11a/b/g/n 20, IEEE 1394 (21) and a memory card I/F 22. To the serial bus 17 is connected a Centronics cable, for example. The NIC 18 controls communication via the network 201. To the USB host 19 is connected an apparatus via a USB cable. The IEEE 802.11a/b/g/n 20 is an interface for a wireless LAN according to these specifications and control communications according to the wireless LAN. The IEEE 1394 (21) is an interface which controls high-speed serial communication. To the memory card I/F 22 are connected various memory cards to perform reading and writing of the data. The memory card can be an SD card, a multi-media card, an xD card, or the like, for example.

The operation part 31 includes a mechanical keyboard and a display such as a liquid crystal display. The operation part 31 receives input operations from the user and displays various screens for the user. The operation part 31 has a touch panel installed therein and is capable of receiving the user operation of the displayed software keys.

The facsimile control unit 32 connects to a public switched network via a NCU (Network Control Unit). The facsimile control unit 32 performs transmission or reception of the facsimile according to a communication procedure (communication protocol) corresponding to a G3 or G4 specification, for example. The facsimile control unit 32 transmits image data after performing signal processing such as data compression and modulation, and decodes the image data received from an opponent party after performing signal processing such as data decompression and error correction.

The plotter 33 is a white and black plotter or a color plotter using electrophotographic technology, for example. The plotter 33 forms an image on a page basis based on data to be printed or the image data read by the scanner 34 and transfers it to a paper sheet. For example, a toner image, which is formed on a photosensitive drum or the like with an electrophotographic process using a laser beam, is transferred to the paper sheet and fused by heat and a pressure applied by a fuser. Further, the printing may be implemented by applying ink droplets.

The scanner 34 optically scans an original document placed on a contact glass, performs an A/D conversion of the reflected light and known image processing to generate image data which is digital image data with a predetermined resolution.

Figure 3:
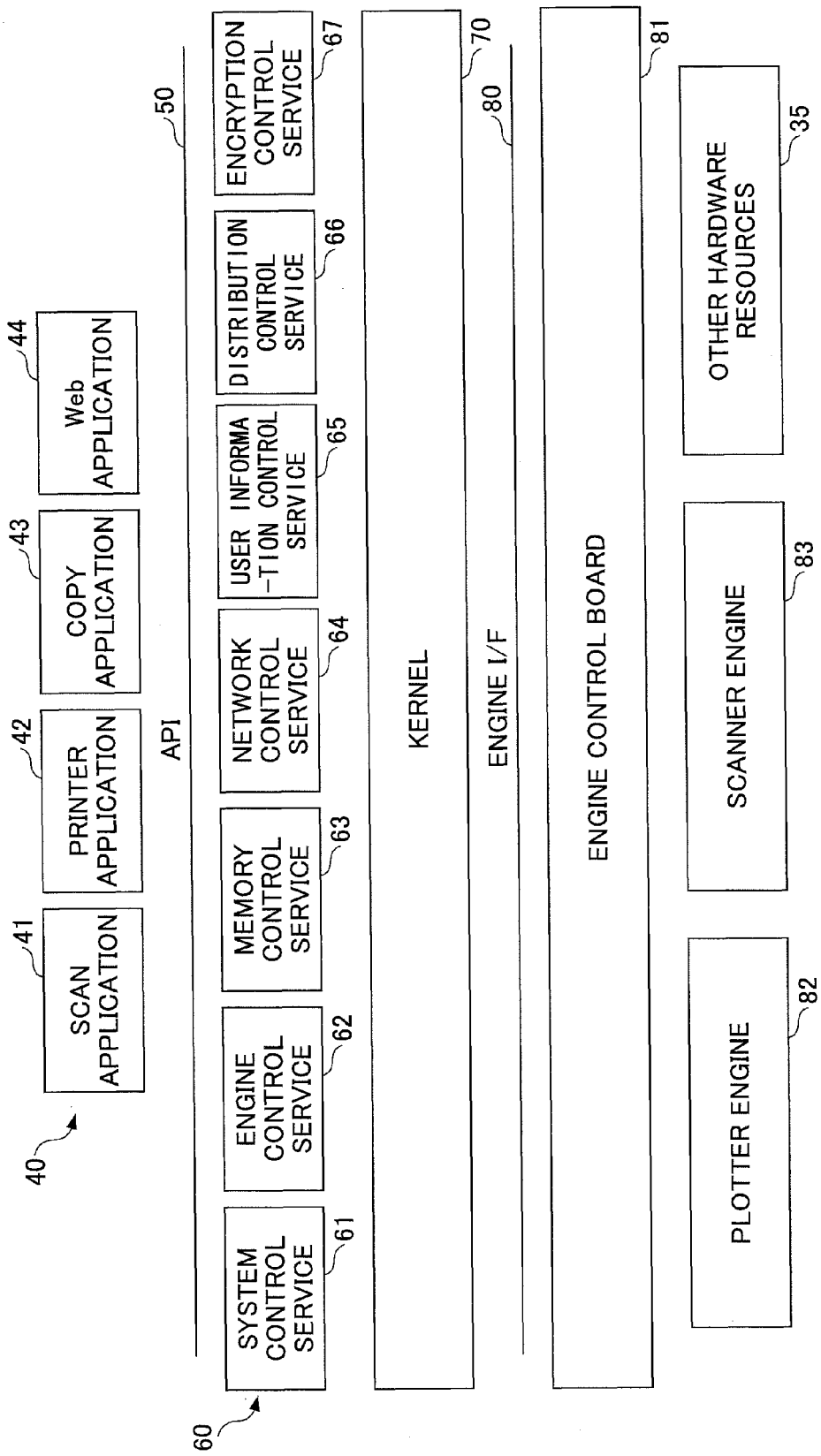
FIG. 3 is a diagram for schematically illustrating a functional configuration of the image forming apparatus.

FIG. 3 is a diagram for schematically explaining a functional configuration of the image forming apparatus 100. The image forming apparatus 100 includes an application 40, an API (Application Interface) 50, a control service 60, a kernel 70, an engine I/F 80, an engine control board 81 and hardware resources.

The control service 60 interprets a process demand from the application 70 to generate a acquisition demand of the hardware resource. The kernel 70 includes an OS and a device driver and performs arbitration with respect to the acquisition demands from the control service 60. The control service 60 includes plural service modules. A system control service 61 performs management of the application 40, control of the operation panel, display of a system screen, a LED display, resource management, control of an interrupt application, etc. An engine control service 62 controls a plotter engine 82, a scanner engine 83 and hardware resources of other hardware resources 35.

A memory control service 63 performs acquisition or release of the image memory, utilization of the HDD 15, compression or decompression of the image data, etc. A network control service 64 transmits data received from the network side to the respective applications 40 connected to the network 201 according to the respective protocols. Further, the network control service 64 processes the data received from the application 40 according to the respective protocols and transmits the processed data via the network 201. A user information control service 65 manages user information such as user names and passwords, etc. A distribution control service 66 performs distribution control when the image data is distributed to the file server. An encryption control service 67 encrypts the image data and decodes it.

The kernel 70 is a general-purpose operating system such as a UNIX (registered trademark) and LINUX (registered trademark). The kernel 70 causes the respective service modules of the application 40 and the control service 60 to operate in parallel.

The application 40 issues the demand of the process to the control service 60 according to a predefined function (API). The application 40 includes a scan application for the scanner; a printer application 42 for converting the data to be printed, which is described in a page description language, into raster data and performing printing according to print conditions; a copy application 43 for performing processes from reading to printing at the time of copying; a Web application 44 for detecting a status of the apparatus via the network 201 and performing setting of the apparatus, etc., for example.

The kernel 70 is connected to the engine control board 81 via the engine I/F 80. The engine I/F 80 is an interface such as a port for the kernel 70 to access to the engine control board 81.

In the engine control board 81 are installed registers for controlling the plotter engine 82, the scanner engine 83 and other hardware resources 35, a circuit for generating a PWM signal, a D/A circuit, an A/D circuit, etc.

The plotter engine 82 is substantially the same as the plotter 33 in FIG. 2 and the scanner engine 83 is substantially the same as the scanner 34 in FIG. 2.

Figure 4:
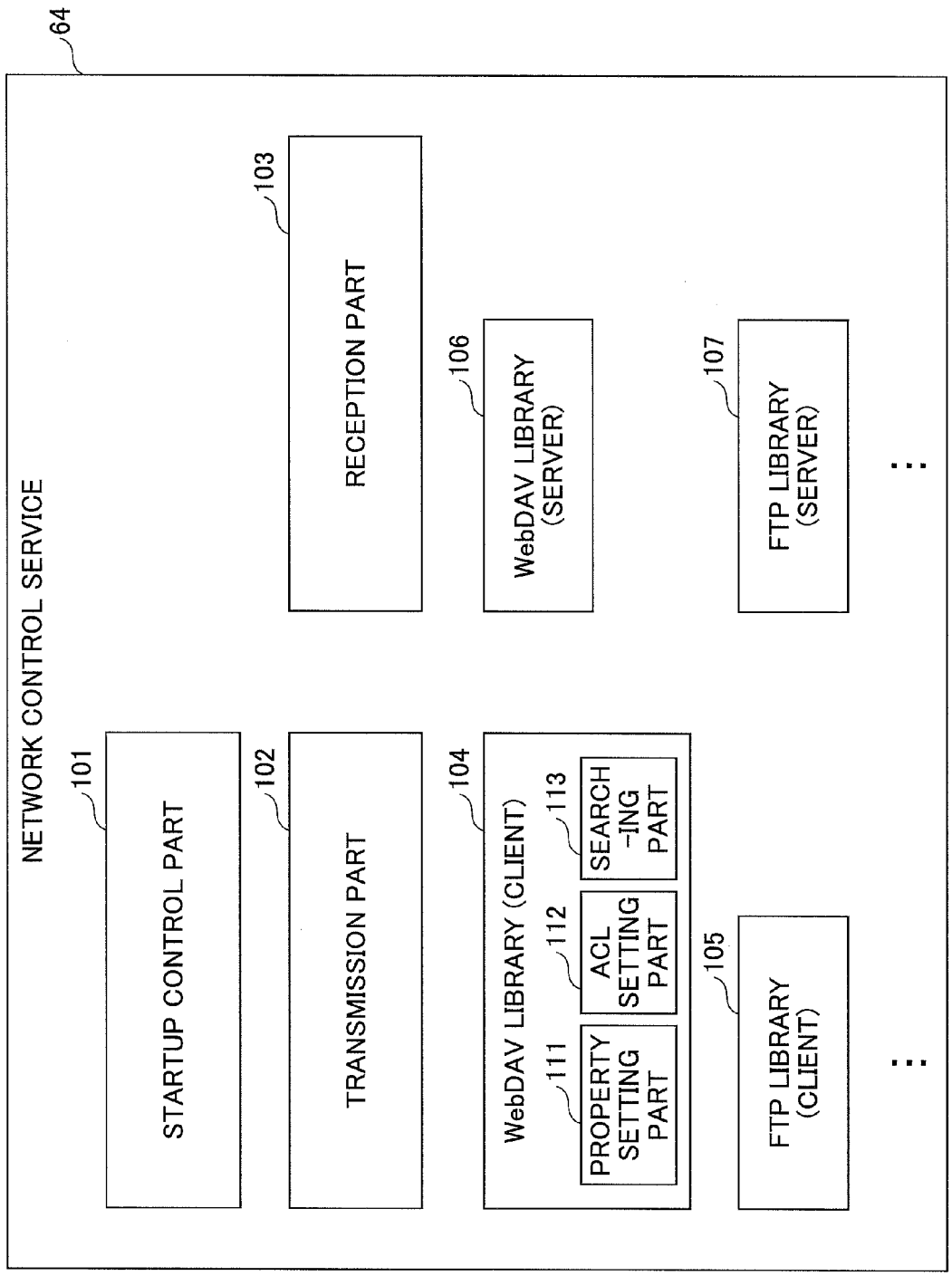
FIG. 4 is a diagram for illustrating an example of an internal module configuration of a network control service.

FIG. 4 is a diagram for illustrating an example of an internal module configuration of a network control service 64. The network control service 64 includes a startup control part 101, a transmission part 102, a reception part 103, a WebDAV library (client) 104, a FTP library (client) 105, a WebDAV library (server) 106 and a FTP library (server) 107. Further, the network control service 64 includes libraries according to the protocols (SNMP, SMTP, NTP, TCP, IP, UDP, etc.) used in the network 201.

The startup control part 101 is a module which manages a startup process and a termination process of the network control service 64. The transmission part 102 manages processes when the data is transmitted from the image forming apparatus 100 to the outside (the file server 200, for example). For example, the transmission part 102 selects the library for calling according to the demand from the application 40 and transmits identification information of the application 40.

The WebDAV library (client) 104 is a protocol stack for providing client functions according to the WebDAV protocol. The WebDAV library (client) 104 includes a property setting part 111, an ACL setting part 112 and a searching part 113. The property setting part 111 sets a property in the image data. The ACL setting part 112 sets an ACL property in the image data. The searching part 113 searches for a value of the property to search for a file with a search key.

The FTP library (client) 105 is a protocol stack for providing client functions according to a FTP protocol. The WebDAV library (server) 106 is a protocol stack for providing server functions according to the WebDAV protocol. The FTP library (server) 107 is a protocol stack for providing server functions according to the FTP protocol.

The reception part 103 performs a series of controls when it receives a file from the file server 200. For example, the reception part 103 causes the WebDAV library (client) 104 to receive the file and causes the printer application 42 to print the received file. It is noted that the library to be used at the time of reception is determined based on a port number of the TCP header.

Figure 5:
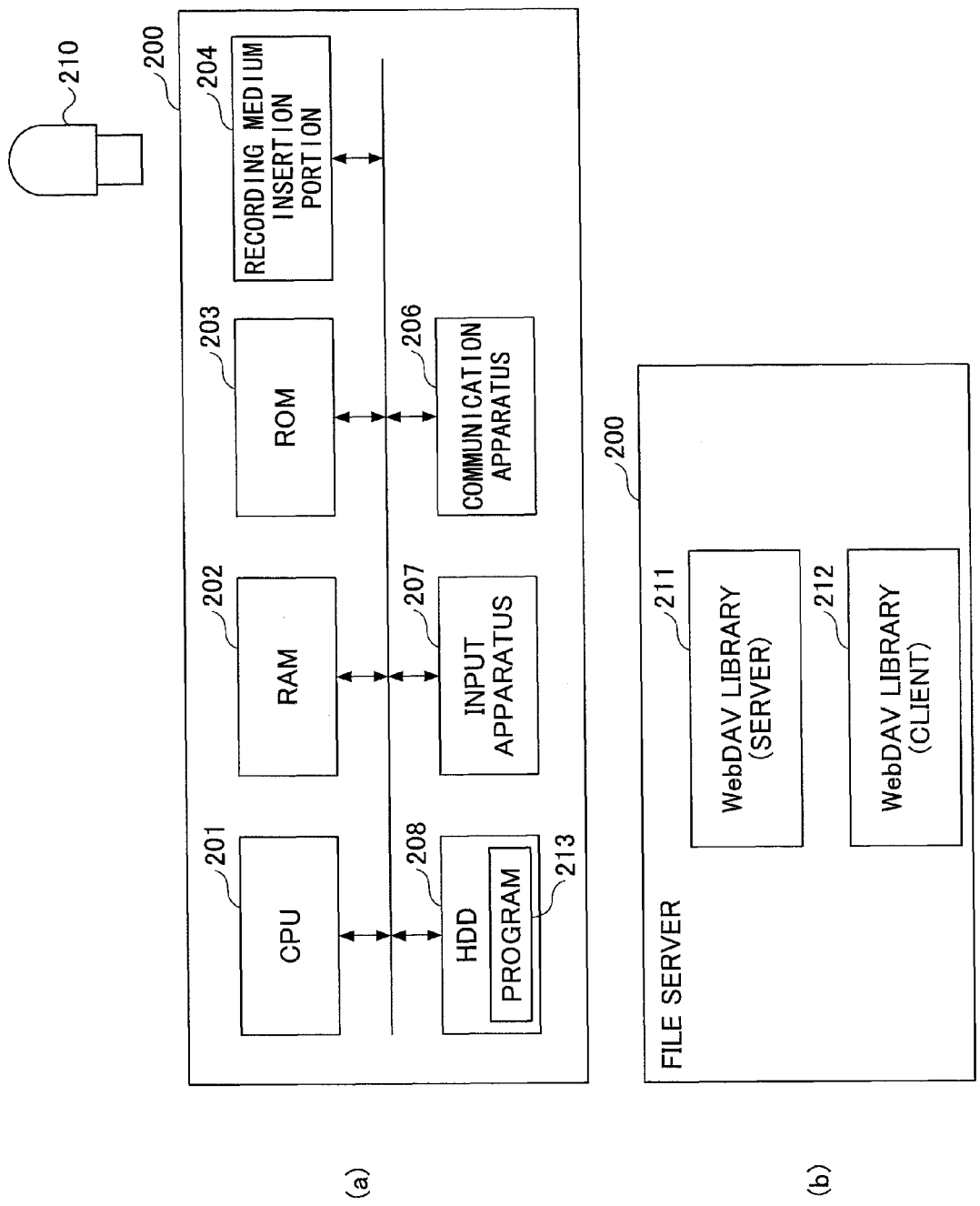
FIG. 5 is a diagram for illustrating an example of a hardware configuration of a file server.

FIG. 5 (*a*) is a diagram for illustrating an example of a hardware configuration of the file server 200. The file server 200 is a kind of a computer. The file server 200 includes a CPU 201, a RAM 202, a ROM 203, a recording medium insertion portion 204, a communication apparatus 206, an input apparatus 207 and a HDD 208 which are connected to via a bus. The CPU 201 reads the OS (Operating System) and programs from the HDD 208 and executes them to provide various functions. Further, the CPU 201 centrally controls the processes performed by the file server 200.

The RAM 202 is a main memory for temporarily storing the data necessary for the CPU to execute the programs. In the ROM 203 are stored a BIOS (Basic Input Output System), programs for starting up the OS and setting files.

To the recording medium insertion portion 204 is detachably inserted a recording medium 210. The recording medium insertion portion 204 reads the programs recorded in the recording medium 210 and stores them in the HDD 208. Further, the recording medium insertion portion 204 can write the data stored in the HDD 208 to the recording medium 210. The recording medium 210 is not necessarily the same as the recording medium in FIG. 2, but is a SD memory card, etc., as is the case with the recording medium in FIG. 2.

The input apparatus 207 is a keyboard, a touch pad (a mouse), etc., and receives various operation instructions from a manager of the file server 200. The input apparatus 207 may be omitted.

The HDD 208 may be a nonvolatile memory such as SSD. In the HDD 208 are stored the OS, the programs and the encrypted image data. The file server 200 includes at least a program 213 of the WebDAV library (server) in order to communicate with the image forming apparatus 100.

The communication apparatus 206 is a NIC for connecting to the network 201 such as the Internet. The communication apparatus 206 is an Ethernet (registered trademark) card, for example.

FIG. 5 (*b*) is an example of a functional block diagram of the file server 200. The file server 200 includes a WebDAV library (server) 211 and a WebDAV library (client) 212. The WebDAV library (server) 211 analyzes a document which is described in a XML form, etc., according to the WebDAV protocol and receives the request. The WebDAV library (server) 211 generates a document according to the request and transmits the generated document to the image forming apparatus 100 as a response. Further, the WebDAV library (server) 211 reads the property from the HDD 208, performs an edit, an addition or deletion or reads the file in response to the request.

[About WebDAV]

The WebDAV is described briefly. The WebDAV is a protocol of the extended version of the HTTP 1.1. The WebDAV is implemented by newly adding a method, a header, etc. The procedure of the communication is the same as the HTTP in which the server returns the response to the request from the client. Further, since the WebDAV does not depend on the file system, the WebDAV is utilized regardless of the OS.

According to the WebDAV, a file is referred to as a resource and a group of the resources is referred to as a collection. The resource is a subject to be operated in the WebDAV. The resource includes not only the data on the network but also software. The collection is similar to a folder of the file system; however, if there is a resource under the resource, the upper resource also becomes the collection and thus the both are not the same.

According to the WebDAV, the attribute of the resource is referred to as a property. As described above, there are live properties and dead properties. In the embodiment, the dead properties are utilized mainly. In the following, the dead properties are referred to as properties, unless otherwise specified.

[An Example of the Property]

FIG. 6 (a) is a diagram for schematically explaining a functional configuration of a property. The property makes a pair with the value of the key. The key corresponds to a name of the property, and the value corresponds to the content of the property. There may be a case where the value has no data stored. The property is described as a XML element. In this case, the key corresponds to the element name and the value corresponds to the content. The number of the properties and the capacity are limited according to the WebDAV.

FIG. 6 (b) illustrates an example of the property described in a XML expression. In this example, it is meant that there is the property whose key is "keyword1" in [http://webexample.com/] (a name space), and the value of the property is "keikaku".

According to the WebDAV, various operations can be performed for the property by using methods. The methods are described below.

[Operation of the Property]

FIG. 7 (a) is a diagram for illustrating an example of a description of a method with respect to a WebDAV request to perform an addition, an edit or a deletion of the property. "PROPPATCH" in the first row in the description 1 corresponds to a method for performing an addition, an edit or a deletion of the property. "/webdav/file1.jpg" is the resource (file) to be operated.

The second row in the description 1 corresponds to an URL of the file server 200 in which the file to which the property is to be added is stored. In the third and fourth rows are described a type of the file and a size of the file.

With respect to the description 2, according to the "DAV:" it is defined that the elements after the tag <d:propertyupdate> use the WebDAV name space. With this arrangement, the web server 200 operates based on the WebDAV schema. <o:Keyword1>keikaku</o:Keyword1> from the tag <d:set> to the tag </d:set> means that the value of the property whose key is "Keyword1" is set to "keikaku".

In other words, according to the method in FIG. 7 (a), to the file "file1.jpg" of the collection "WebDAV" in the server "web.example.co.jp" is added the property (key="Keyword1" and value="keikaku"). It is noted that if the property already has a separate name, the original value is overwritten. Further, if nothing is set as the value, the value of the property is deleted. Such generation of the WebDAV request is performed by the property setting part 111.

FIG. 7 (b) is a diagram for illustrating an example of a description of a method with respect to a WebDAV request to obtain the property of the specified resource. The first row "PROPFIND" in the description 1 corresponds to a method to search for the key of the property. The description 1 is substantially the same as that in FIG. 7 (a); however, there is a header "Depth: 0". The "Depth" is a header for specifying the acquisition range of the resource. The "Depth: 0" indicates that only the specified resource (i.e., even if there is a resource under this resource, the lower resource is not searched for) is to be searched for.

<d:propfind xmlns:d="DAV:"> means that at first, the file server 200 executes PROPFIND based on "DAV:" schema. Then, it is described that the property whose key is "Keyword1" and the value of the property "displayname" are acquired. The displayname corresponds to the property in which the file name is stored.

In other words, according to the method in FIG. 7 (b), from the property of the file "file1.jpg" of the collection "WebDAV" in the server "web.example.co.jp" the values of the properties of the key=Keyword1 and key=displayname are acquired. In the example illustrated in FIG. 7 (a), since the value "keikaku" is set in the property, the file name "keikaku" is transmitted from the file server 200 to the image forming apparatus 100.

Further, according to the WebDAV, there are more methods such as "MKCOL" for generating the collection, "COPY" for copying the resource including the collection and the property, "MOVE" for moving the resource including the collection, "LOCK" for locking the resource, and "UNLOCK" for releasing the lock of the resource.

[Search of the Property]

FIG. 8 is a diagram for illustrating an example of a description of a method with respect to a WebDAV request to search for the value of the property. The tag <D:basicsearch> in the description 1 means the method of the search. The tags <D:select> through </D:select> describe which value of the properties of the resources hit by the search are to be acquired.

Specifically, with respect to the resources hit by the search, the values of the keyword1, keyword2 . . . between the tags <D:prop> through </D:prop> are transmitted to the image forming apparatus 100.

The tags <D:from> through </D:from> specify the search range in the file server 200. <D:href>/webdav/</D:href> indicates hierarchies under the WebDAV content. <D:depth>infinity</D:depth> indicates the search range is unlimited. Thus, all the resources of the hierarchies under the WebDAV content are to be searched for.

The description 3 defines the search condition. <D:prop><D:keyword1/></D:prop> indicates the property to be searched for. The tags <D:eq> through </D:eq> mean that the resource including the property whose value corresponds to "keikaku" of <D:literal>keikaku</D:literal> is to be searched for. Such a search of the resources is performed by the searching part 113.

[ACL]

Next, the access control of the resources and the properties is described. Since the physical file server 200 is not always located near the user in the cloud service, the WebDAV defines an access limit (or access right) to the resources. The file server 200 can control, with the access limit, resources which the respective users can access and resources which the respective users cannot access.

According to the WebDAV, an entity which accesses the resources is referred to as PRINCIPAL. Thus, the PRINCIPAL is a user or a group, for example; however, there may be a case where the software becomes the PRINCIPAL. The PRINCIPAL is expressed by the URI. For example, if the PRINCIPAL is expressed as "http://www.webexample.com/acl/users", the access right to the resource is defined with respect to the users registered in this URI. In this URI are registered the user names and IDs which are input when the users log in to the information processing apparatus 100.

Further, according to the WebDAV, the access right is referred to as PRIVILEGES. In the following, representative access rights are described.

(1) DAV: read This defines whether the user can acquire the content or the property of the resource. GET method of HTTP based methods and the PROPFIND method described above are influenced by this access right.
(2) DAV: write This defines whether the user can change the content or the property of the resource. PUT of HTTP based methods and the PROPPATCH method are influenced by this access right.
(3) DAV: read-acl This defines whether the user can acquire the ACL property set in the resource. If this authority is permitted, it is possible to acquire the ACL property of the resource using the PROPFIND method.
(4) DAV: write-acl This defines whether the user can edit, add or delete the ACL property set in the resource. In other words, the authority to modify the ACL property can be controlled. If this authority is permitted, it is possible to edit, add or delete the ACL property of the resource using the PROPPATCH method.
(5) DAV:all This indicates the full authority (PRIVILEGE) applicable to the resource.

FIG. 9 illustrates an example of the ACL property. The ACL property is treated as a group of one or more ACEs (Access Control Element). In FIG. 9, the tags <D:ace> through </D:ace> correspond to a single ACE. As illustrated by the description 1, in the tags <D:principal> through </D:principal> are defined the users by http://www.webexample-.com/acl/users1 who are given the authority.

The tags <D:grant> through </D:grant> indicate that the access right is granted. If the access right is denied, the tags <D:deny> through </D:deny> are used. The tags <D:privilege><D:read/></Dprivilege> mean that this user is given the authority to acquire the resource or the property.

Similarly, the tags <D:privilege><D:write/></Dprivilege> in the description 2 mean that the user is given the authority to set the resource or the property.

The setting of the ACL property may be performed as is the case with the setting of the property. Specifically, the setting of the ACL property may be described as illustrated in FIG. 7 (a) using the "PROPPATCH" method. Such a setting of the ACL property is performed by the ACL setting part 112.

It is noted that the user name of the user who operates the image forming apparatus 100 may be subject to the authentication as is the case with the HTTP communication. The user inputs the user name and the password when the user logs in to the image forming apparatus 100. In the case of BASIC authentication which is a basic authentication method, when the image forming apparatus 100 accesses the file server 200, the file server 200 transmits a response "Authorization Required". In response to this, the image forming apparatus 100 describes the user name and the password input by the user in the Authorization header and transmits a request to the file server 200 again. The user name and the password are encoded according to Base64. Instead of waiting for the "Authorization Required", the request which originally includes the Authorization header may be transmitted to the file server 200.

The file server 200 reads the access right from the PRINCIPAL of the URI and determines whether the user is permitted to use the method demanded by the request of the user. If the user is permitted, the file server 200 transmits the resource or the property to the image forming apparatus 100. If the user is not permitted, the file server 200 transmits an error code to the image forming apparatus 100.

[Operation Procedure]

Figure 10:
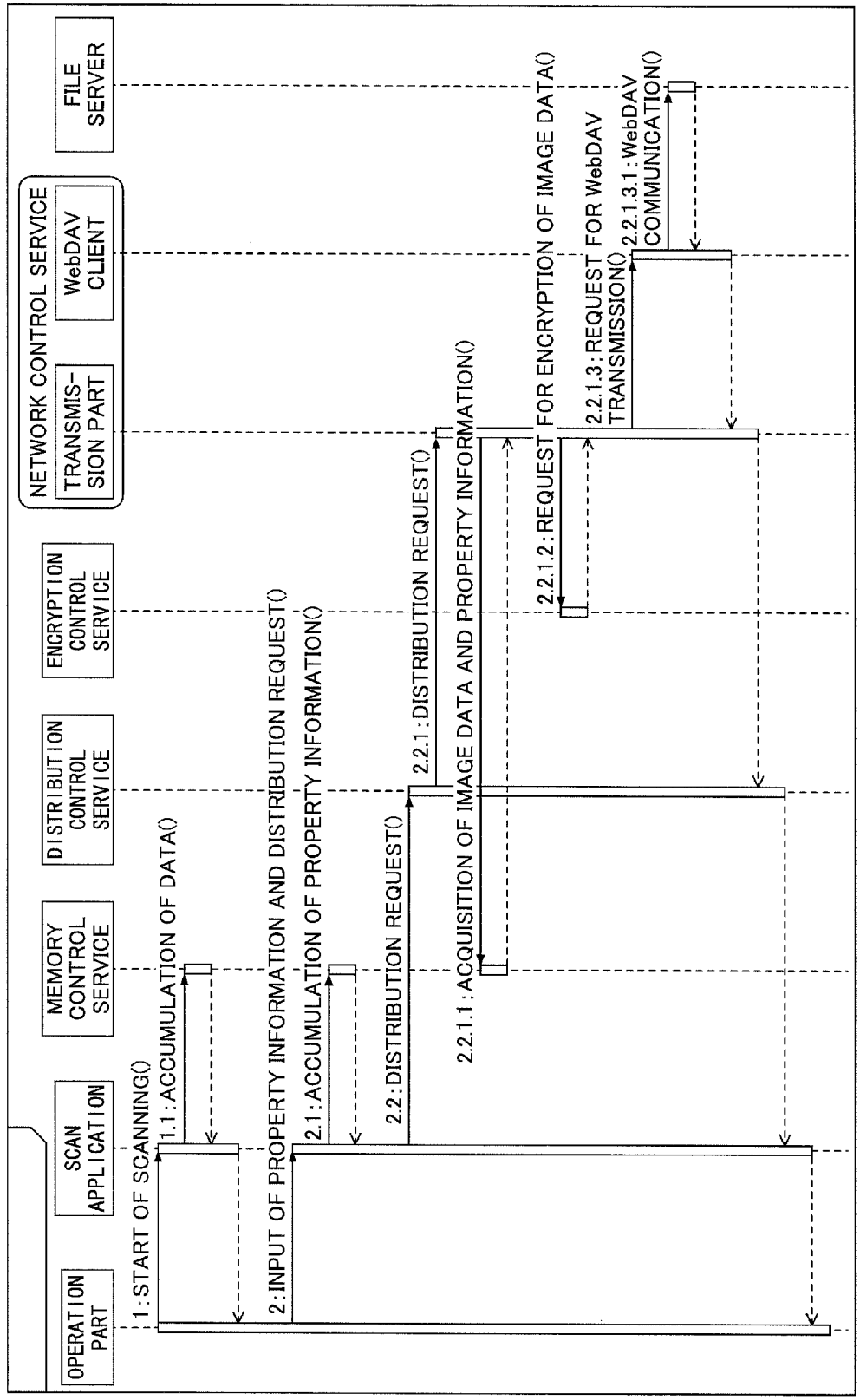
FIG. 10 is a flowchart of an example of a procedure by which the image forming apparatus transmits the scanned image data to a file server.

FIG. 10 is a flowchart of an example of a procedure by which the image forming apparatus 100 transmits the scanned image data to the file server 200.

S1: At first, the user operates the operation part 31 to call the scan application 41. Then, the user sets the original document on the contact glass, sets the values of the resolution, the accumulation, etc., and presses a start switch. This causes the scanning operation to start. It is noted that the image data transmitted to the file server 200 is not limited to the image data obtained by the scanning operation of the scanner application. The image data transmitted to the file server 200 may be the image data of the document which is transmitted by a PC (not illustrated) to the image forming apparatus 100.

S1.1: The scan application 41 stores the obtained image data in the memory control service 63. The scan application 41 displays, on the operation part 31, the fact that the scanning operation is completed and the number of the pages, etc., based on the response from the memory control service 63. At that time, it is preferred that the scan application 41 displays an input screen for inputting the keyword to be set in the property.

FIG. 11 is a diagram for illustrating an example of an input screen displayed on the operation part 31 for inputting the keyword. This screen has a message "please input a password" and six keyword input fields. When the user touches any keyword input field, a software key board is displayed, for example. In this case, the user can input characters or numbers freely. In the example illustrated in FIG. 11, there are six keyword input fields; however, all the keywords are not necessarily input. Further, more than six keyword input fields may be provided.

Further, the file name is given by the scan application 41, for example, using "Christian Era year+date and time" or unique numbers, symbols, letters or a combination thereof. As described above, the file name is stored in the property "displayname". It is noted that the file names given by the scan application 41 may be stored in a predetermined keyword such as the keyword 1.

Further, the scan application 41 may transmit identification information of the apparatus, a serial number, application identification information, etc., to the network control service. With this arrangement, since the network control service can set these in a particular property (referred to as a dedicated property, hereinafter), it is possible to track the image forming apparatus which registered the file in the file server 200.

Further, when the image forming apparatus 100 prints the file, the image forming apparatus 100 reads the value of the dedicated property, and determines whether the apparatus is made by the same maker based on the identification information of the apparatus or determines whether the image forming apparatus 100 which the user operates is the same at the image forming apparatus 100 which generates the image data, thereby enabling the control such as rejecting the printing.

The network control service can perform the access control for the dedicated property and other properties individually. Further, the access control may be performed on a dedicated property basis. The image forming apparatus can change the access control of the dedicated property according to the user who logs in, for example.

It is noted that since the user cannot operate on the property other than the keyword via the image forming apparatus, there is no possibility that the dedicated property is rewritten.

S2: The user sets one or more items of the property information via the operation part 31, and then presses the start switch. In this way, the scan application 41 receives the distribution request of the image data. What is input by the user is the value of the property, and the key is predetermined.

S2.1: The scan application 41 stores the property information input by the user in the memory control service 63. The memory control service 63 notifies the scan application 41 that the storing operation is completed.

S2.2: The scan application 41 requests the distribution control service to distribute the image data, by specifying the file name, for example.

S2.2.1: The distribution control service passes on the distribution request from the scan application 41 to the transmission part 102 of the network control service 64.

S2.2.1.1: The transmission part 102 obtains the image data and the property information from the memory control service 63.

S2.2.1.2: The transmission part 102 requests the encryption control service 67 to encrypt the image data among the obtained image data and the property information. If only the image forming apparatus 100 performs decoding, the encryption control service 67 may perform the encryption using a private-key encryption method such as FEAL, IDEA, or AES.

S2.2.1.3: The transmission part 102 requests the WebDAV library (client) 104 to transmit the encrypted image data and the property information according to the WebDAV.

S2.2.1.3.1: The WebDAV library (client) 104 transmits the image data and the property information to the file server 200. The PUT method is used to transmit the image data, for example. The PROPPATCH method described above is used to transmit the property information. When the image data and the property information are registered in the file server 200, this fact is displayed on the operation part 31.

It is noted that the file server 200 reads the access right of the user name in the Authorization header from the ACL and determines whether the PROPPATCH method is permitted. If the PROPPATCH method is permitted, the file server 200 registers the keyword, which is set by the user, in the property of the image data.

Further, the ACL setting part 112 subsequently sets the ACL property to the image data to perform the access limit. The access right such as "DAV:read" and "DAV:read-acl" is set. The access right to be set is predetermined according to the users, etc.

Further, according to the WebDAV, a DAV:OWNER property is prepared for registering the owner of the file. In the DAV:OWNER property is registered the user name of the user (owner of the resource) who performs the scanning. The file server may permit special authority with respect to the owner.

Figure 12:
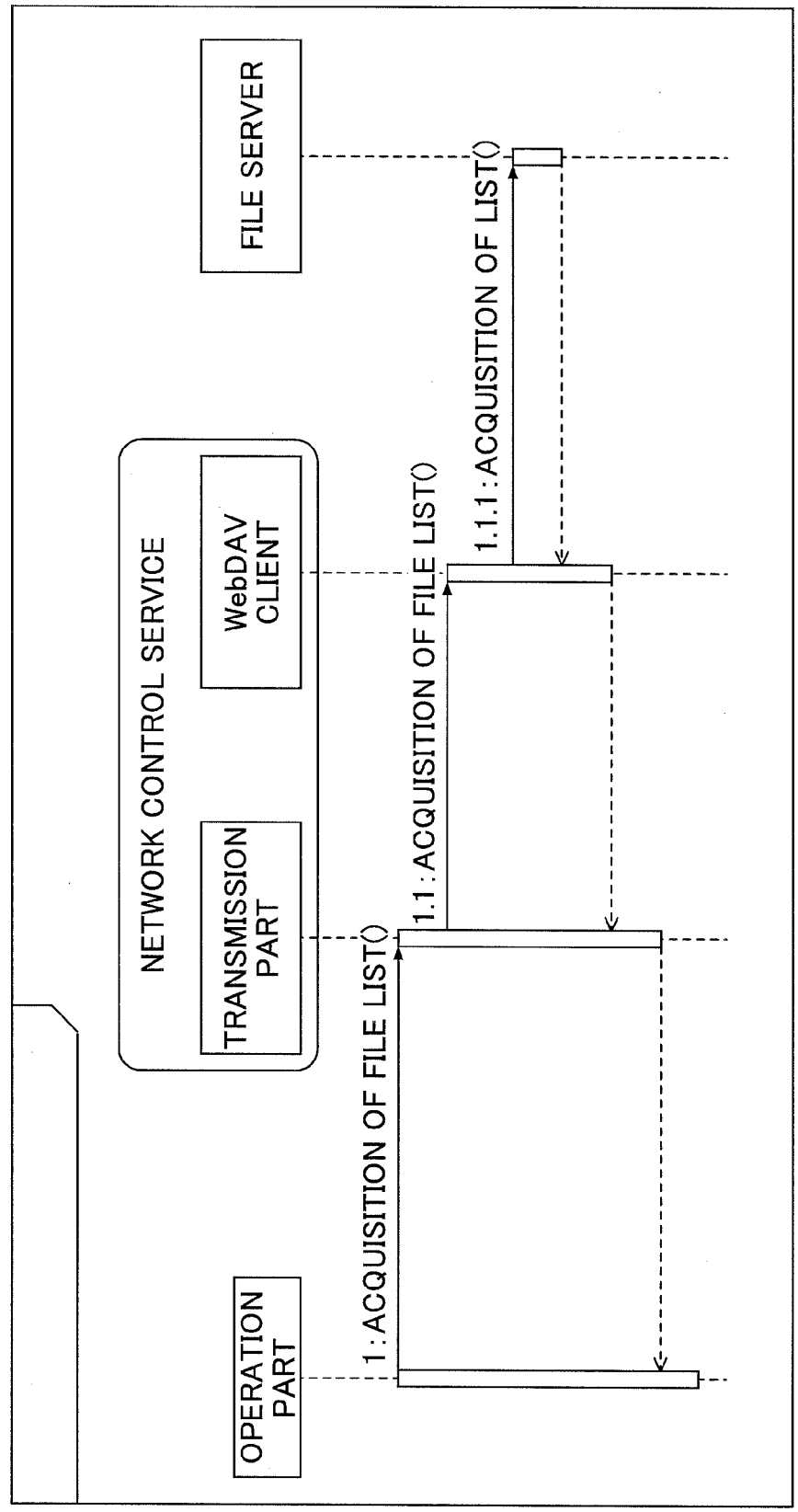
FIG. 12 is a flowchart of an example of a procedure by which the image forming apparatus obtains a list of files from the file server.

FIG. 12 is a flowchart of an example of a procedure by which the image forming apparatus 100 obtains a list of files from the file server 200.

S1: The user operates the operation part 31 to acquire a file list. The operation part 31 accepts the file list operation and outputs it to the transmission part 102 of the network control service 65.

The file list is a list of the file names, for example. According to the HTTP, if there is not an index.html file in the directory of the server associated with the URL which the web browser accesses, the server software generates HTML data in which the files included in the directory are listed, and transmits it to the client (if the listing is permitted according to the setting in the server). However, according to such a method, an arbitrary user can view all the files in the file server 200.

To the contrary, according to the WebDAV, it is possible to utilize the PROPFIND method in acquiring the list of the files. The file name is stored in the displayname property. Thus, if the WebDAV request of the PROPFIND method is transmitted with specifying the displayname property, the file list can be obtained.

In this case, the WebDAV library (client) 104 sets a route directory in the directory to be searched and infinity in the "Depth", respectively, generates a request to execute the PROPFIND method with respect to the displayname property, and transmits the request to the file server 200.

However, if the scan application 41 automatically gives the file names, there is a probability that the user cannot select a desired file from the file list. For this reason, it is preferred that when the file list is displayed, the keywords 1 through 6 are displayed together.

Further, instead of displaying the file list, the file server 200 may search for the value of the property according to the search key input by the user and transmit only the files which are hit by the search to the image forming apparatus.

FIG. 13 (*a*) is a diagram for illustrating an example of a search screen displayed on the operation part 31. This search screen is divided by tabs and the selection of the keywords 1 through 6 and the input of the search key are possible on a tab basis. The user selects radio buttons of the keywords 1 through 6 to select one or more keywords to be searched for. Further, the user inputs the search key in an input field using a software keyboard or the like.

As described above, the searching part 113 of the WebDAV library (client) 104 specifies the keywords 1 through 6 to be searched for to describe the search key input by the user in the tags <D:literal> through </D:literal>. In this way, the image data for which the values of the keywords 1 through 6 to be searched for correspond to the search key input by the user is extracted.

S1.1: The transmission part 102 requests the WebDAV library (client) 104 to acquire the file list.

Since the file server 200 transmits the file list of the file server 200 to the WebDAV library (client) 104, the transmission part 102 displays the file list on the operation part 31.

FIG. 13 (*b*) is a diagram for illustrating an example of a file list screen displayed on the operation part 31. In this file list screen are displayed the search key "project" input by the user and the file names "1.jpg through 3.jpg" of the files which are hit by the search. Further, next to the respective file names are displayed all the keywords 1 through n input by the user. The user can select the file which the user desires to print from the file list by checking the keywords 1 through n or the file names. When the user selects one or more files (make them reversed, for example) and presses the print button, the printing is started.

Figure 14:
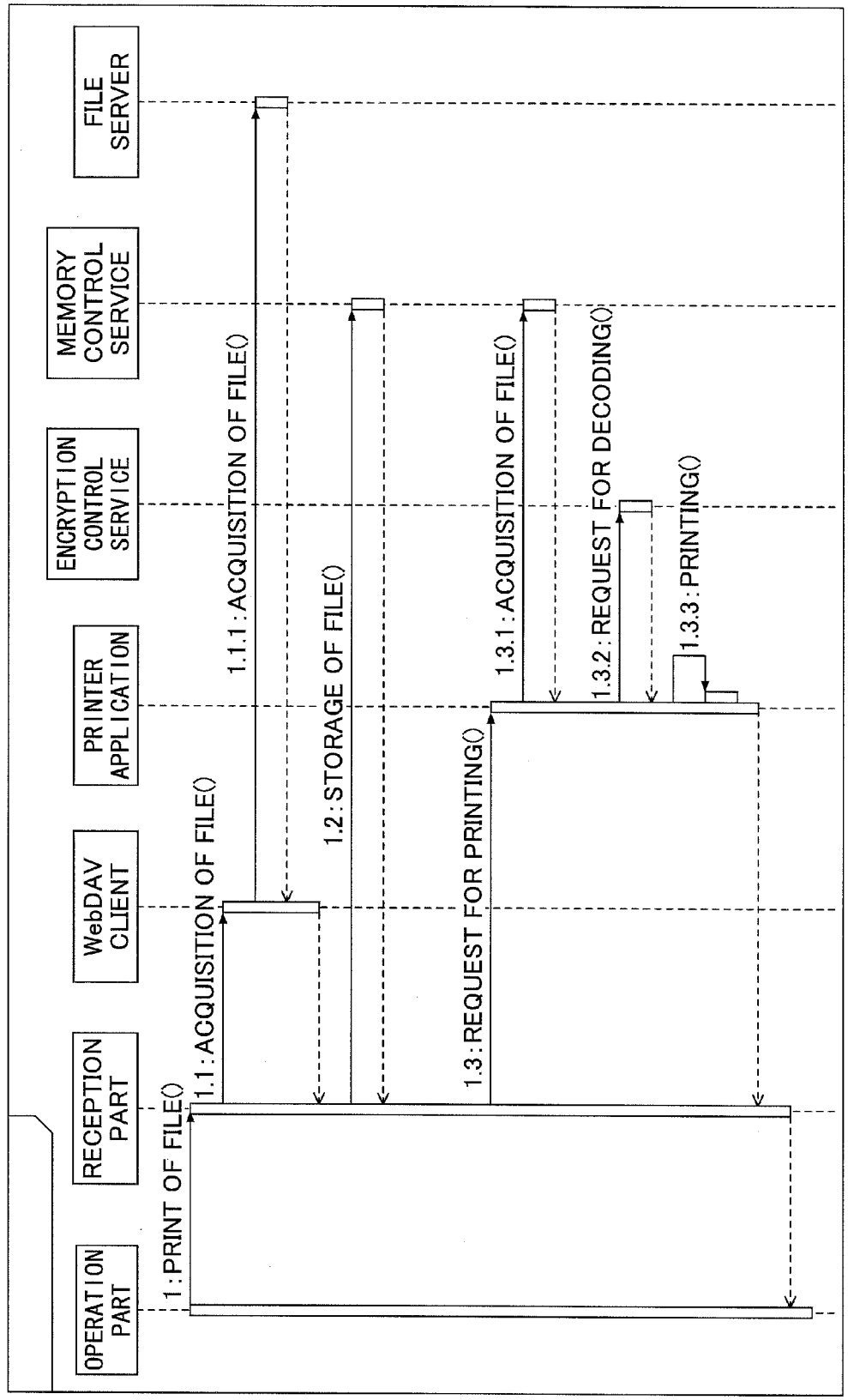
FIG. 14 is a sequence diagram for illustrating an example of a procedure by which the image forming apparatus prints the image data which is selected by a user from the list of files or the searched files.

FIG. 14 is a sequence diagram for illustrating an example of a procedure by which the image forming apparatus 100 prints the image data which is selected by the user from the file list or the searched files.

For example, at this timing, the image forming apparatus can display such that only the files which can be printed are selectable.

FIG. 15 is a flowchart of an example of a procedure by which the image forming apparatus determines whether to permit printing based on the property. The image forming apparatus has acquired the file together with the property including the identification information of the image forming apparatus.

The image forming apparatus reads the property including the identification information of the image forming apparatus (S10). Then, on a file basis, the image forming apparatus reads its own identification information from the ROM or the like and determines whether it corresponds to the identification information of the property (S20).

If two items of the identification information correspond to each other (Yes in S20), the image forming apparatus displays the file name such that it is selectable (S30), because the image forming apparatus itself has registered this file in the file server.

If two items of the identification information don't correspond to each other (No in S20), the image forming apparatus displays the file name with reduced luminance, for example (S40), because the image forming apparatus itself did not register this file in the file server. The file with the reduced luminance cannot be selected by the user. In this way, print control becomes easier by utilizing the property.

S1: Returning to FIG. 14, the user operates the operation part 31 to select the file to be printed and perform the operation to print the file. The operation part 31 accepts the operation to print the file and makes the notification to the reception part 103. It is noted that the user sets the print conditions such as color/monochrome, single-side and double-side, an intensive manner, etc., but such settings may be performed after the image file is received.

S1.1: The reception part 103 requests the WebDAV library (client) 104 to acquire the file. In order to distinguish the file, the URI is notified, for example.

S1.1.1: The WebDAV library (client) 104 generates the WebDAV request and requests the file server 200 to transmit the image data. This method is supported by the GET method or the like in the HTML, for example. The file server 200 transmits the requested image data to the WebDAV library (client) 104. Further, the WebDAV library (client) 104 notifies the reception part 103 that the requested image data is received.

S1.2: The reception part 103 requests the memory control service 63 to store the file.

S1.3: The reception part 103 requests the printer application to print the specified file.

s1.3.1: The printer application acquires the file to be printed from the memory control service 63.

S1.3.2: The printer application requests the encryption control service to decode the file.

S1.3.3: The printer application prints the decoded file. In this way, the image data selected from the list of the files accumulated in the file server is printed.

As described above, the image forming apparatus 100 according to the embodiment can easily edit, add or delete the property (metadata) of the encrypted image data, using the WebDAV protocol which is easy to install.

Further, since the access authority with respect to the property is set, the user can limit the reading of the keyword, the editing, the addition or the deletion of the keyword on a file basis.

The present application is based on Japanese Priority Application No. 2011-144712, filed on Jun. 29, 2011, the entire contents of which are hereby incorporated by reference.

What is claimed is:

1. An image forming apparatus connected to an information processing apparatus via a network, the information processing apparatus being configured to accumulate image data of files, the image forming apparatus comprising:
   a memory;
   a communicating part configured to communicate with the information processing apparatus;
   a data obtaining part configured to obtain image data to be accumulated in the information processing apparatus;
   an encrypting part configured to encrypt the image data to be accumulated in the information processing apparatus;
   a metadata generating part configured to transmit the encrypted image data to be accumulated to the information processing apparatus, and set metadata according to a Web-based distributed authoring and versioning protocol (WebDAV protocol), which is received or generated by an operation receiving part, in a property portion of the image data to be accumulated, wherein the property portion includes live properties which the information processing apparatus sets and manages according to the WebDAV protocol and dead properties in which the metadata is set according to the WebDAV protocol, the dead properties being set and managed by the image forming apparatus; and
   an access control information setting part configured to set access control information which defines whether to permit an edit, an addition or a deletion of the metadata as well as an access entity for the image data accumulated in the information processing apparatus, the edit, the addition or the deletion of the metadata being performed according to the WebDAV protocol.

2. The image forming apparatus of claim 1, wherein the metadata setting part sets particular metadata among the generated metadata in a predetermined property.

3. The image forming apparatus of claim 1, wherein the access control information setting part defines whether to permit an edit, an addition or a deletion of the metadata on a metadata basis.

4. The image forming apparatus of claim 1, further comprising a searching part configured to transmit a search demand of the metadata which corresponds to a search key received by the operation receiving part according to the WebDAV protocol, and
   a display configured to display a list of files transmitted from the information processing apparatus together with the metadata, the files having the metadata set therein which corresponds to the search key.

5. The image forming apparatus of claim 4, wherein when the image forming apparatus receives the accumulated image data from the information processing apparatus, the image forming apparatus receives metadata which includes identification information for identifying an image forming apparatus which generates the accumulated image data, and determines whether to permit printing based on the received identification information.

6. A file management system, comprising:
   an information processing apparatus configured to accumulate image data of files and an image forming apparatus, the information processing apparatus and the image forming apparatus being capable of communicating via a network; wherein the image forming apparatus includes:

a memory;

a communication device configured to communicate with the information processing apparatus:

a data obtaining part configured to obtain image data to be accumulated in the information processing apparatus:

an encrypting part configured to encrypt the image data to be accumulated in the information processing apparatus;

a metadata generating part configured to transmit the encrypted image data to be accumulated to the information processing apparatus, and set metadata according to a Web-based distributed authoring and versioning protocol (WebDAV protocol) in a property portion of the image data to be accumulated, wherein the property portion includes live properties which the information processing apparatus sets and manages according to the WebDAV protocol and dead properties in which the metadata is set according to the WebDAV protocol, the metadata being received or generated by an operation receiving part, the dead properties being set and managed by the image forming apparatus; and an access control information setting part configured to set access control information which defines whether to permit an edit, an addition or a deletion of the metadata as well as an access entity for the image data accumulated in the information processing apparatus, the edit, the addition or the deletion of the metadata being performed according to the WebDAV protocol; wherein the information processing apparatus includes:

a determining part configured to determine, if there is a demand of the edit, the addition or the deletion of the metadata from the metadata setting part, whether the access entity is permitted to perform the edit, the addition or the deletion based on the access control information.

7. A non-transitory computer-readable recording medium on which a computer program is stored, the computer program causing an image forming apparatus, which is connected to an information processing apparatus, which is configured to accumulate image data of files, via a network and includes a communicating part configured to communicate with the information processing apparatus and a data obtaining part configured to obtain image data to be accumulated in the information processing apparatus, to perform steps of:

encrypting the image data to be accumulated in the information processing apparatus;

transmitting the encrypted image data to be accumulated to the information processing apparatus, and setting metadata according to a Web-based distributed authoring and versioning protocol (WebDAV protocol), which is received or generated by an operation receiving part, in a property portion of the image data to be accumulated, wherein the property portion includes live properties which the information processing apparatus sets and manages according to the WebDAV protocol and dead properties in which the metadata is set according to the WebDAV protocol, the dead properties being set and managed by the image forming apparatus; and setting access control information which defines whether to permit an edit, an addition or a deletion of the metadata as well as an access entity for the image data accumulated in the information processing apparatus, the edit, the addition or the deletion of the metadata being performed according to the WebDAV protocol.

* * * * *